United States Patent [19]

Martinez Corral et al.

[11] Patent Number: 4,733,764
[45] Date of Patent: Mar. 29, 1988

[54] CLUTCH RELEASE BEARING ASSEMBLY

[75] Inventors: Cecilio Martinez Corral; Carlos Lopez Perez, both of Madrid, Spain

[73] Assignee: Fraymon S.A., Murcia, Spain

[21] Appl. No.: 916,802

[22] Filed: Oct. 8, 1986

[30] Foreign Application Priority Data

Oct. 9, 1985 [FR] France .................. 85 14924

[51] Int. Cl.$^4$ ............................. F16D 23/14
[52] U.S. Cl. .................. 192/98; 192/70.13; 192/DIG. 1
[58] Field of Search ............ 192/98, 70.13, 89 B, 192/110 B, DIG. 1

[56] References Cited

U.S. PATENT DOCUMENTS

| | | | |
|---|---|---|---|
| 4,228,882 | 10/1980 | Huber et al. | 192/98 |
| 4,399,898 | 8/1983 | Olschewski et al. | 192/98 |
| 4,405,041 | 9/1983 | Broadbent | 192/98 |
| 4,502,583 | 3/1985 | Limbacher | 192/98 |
| 4,560,053 | 12/1985 | Lassiaz | 192/98 |
| 4,588,061 | 5/1986 | Mallet | 192/98 |
| 4,613,027 | 9/1986 | Lassiaz et al. | 192/89 B |
| 4,632,237 | 12/1986 | Maycock et al. | 192/98 |
| 4,646,897 | 3/1987 | Winters | 192/98 |
| 4,646,898 | 3/1987 | Muller | 192/98 |
| 4,648,499 | 3/1987 | Despres et al. | 192/98 |

FOREIGN PATENT DOCUMENTS

| | | | |
|---|---|---|---|
| 3113463 | 12/1982 | Fed. Rep. of Germany . | |
| 2304826 | 10/1976 | France | 192/98 |
| 2518678 | 6/1983 | France . | |
| 2062799 | 5/1981 | United Kingdom . | |
| 2098697 | 11/1982 | United Kingdom | 192/70.13 |

Primary Examiner—Rodney H. Bonck
Assistant Examiner—Richard M. Lorence
Attorney, Agent, or Firm—Charles E. Brown; Charles A. Brown

[57] ABSTRACT

A clutch release bearing assembly comprises a coupling part adapted to couple a clutch release bearing to a clutch release device of a clutch. A substantially axial bush is attached to the clutch release device. There is an engagement bearing surface at the end of this bush. A drive part which is part of the clutch release bearing comprises an annular groove. A decoupling part is slidably mounted on the drive part. A fastening device operative in traction is disposed between the coupling part and the drive part. It couples these parts in the axial direction from the clutch release device to the clutch release bearing. It comprises an annular fastening ring which is disposed around the axis of the assembly. This ring is elastically deformable in the radial direction and at least partially interlocked on the clutch release bearing side with a bearing surface on the coupling part. On the opposite side it is at least partially interlocked with a bearing surface on the drive part formed by one of the flanks of the groove on the drive part. The other flank of this groove is movable axially relative to the first-mentioned flank and forms part of the decoupling part. This comprises a positioning device which is elastically deformable inwardly and which has an outside diameter when unstressed which is greater than the inside diameter of the engagement bearing surface on the bush. The positioning device bears on the engagement bearing surface during assembly so as to urge the decoupling part towards the transverse abutment member.

10 Claims, 6 Drawing Figures

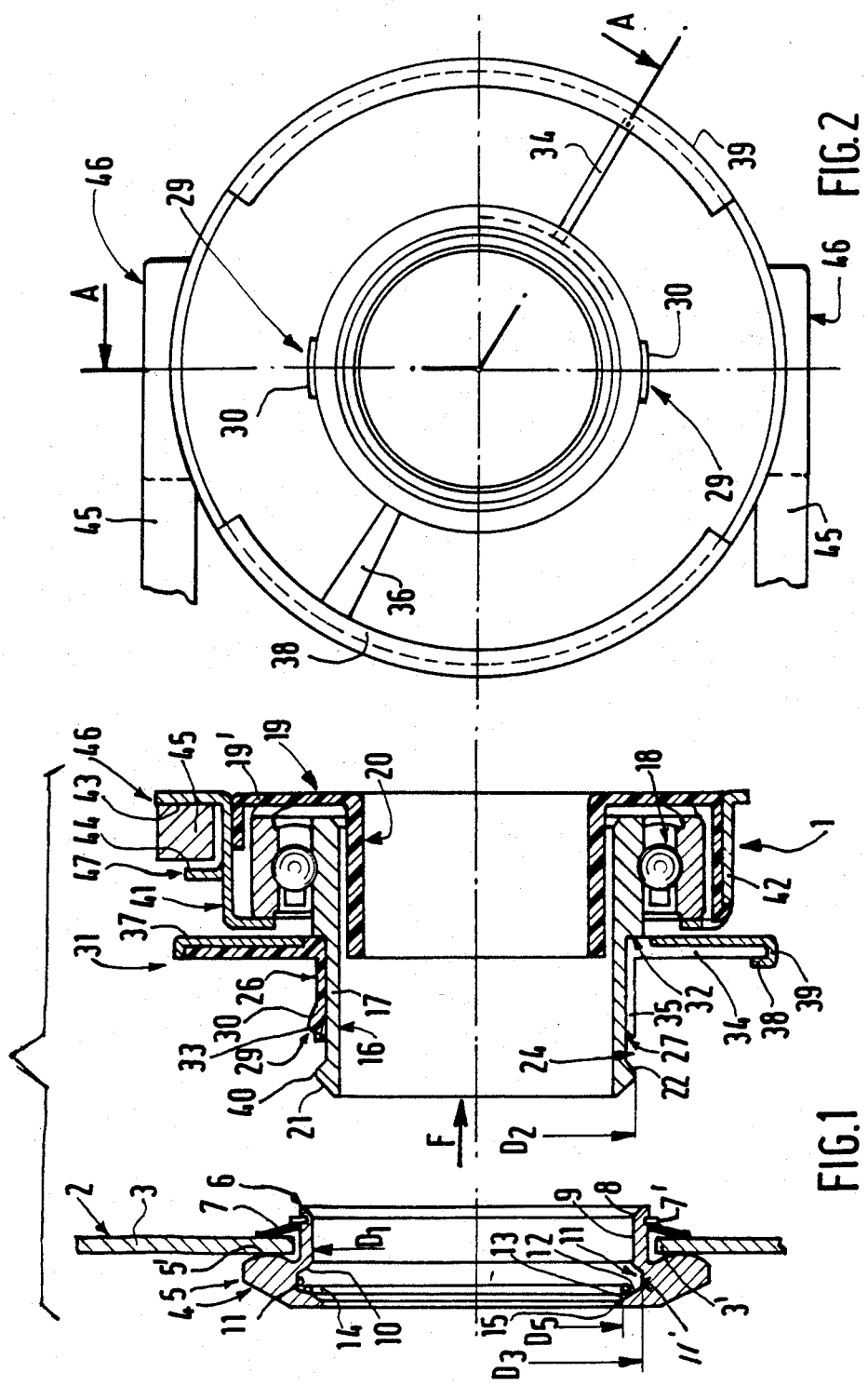

0
CLUTCH RELEASE BEARING ASSEMBLY

BACKGROUND OF THE INVENTION

1. Field of the Invention

The present invention is generally concerned with clutch release bearings, in particular those for automobile vehicles.

It is more particularly directed to a clutch release bearing of the so-called "pull" type designed to act in traction on the clutch release device of a clutch to be operated, for example the ends of fingers of a diaphragm spring.

The problem in this instance is that, although necessary disposed for the main part outside the clutch, the clutch release bearing must nevertheless be able to act within the latter, on the inside surface of the clutch release device, so as to be capable of exerting traction on it.

2. Description of the Prior Art

In some clutch release bearing assemblies, and in particular in the clutch release bearing assembly described in commonly assigned U.S. patent application Ser. No. 683,390 of Dec. 19, 1984, now U.S. Pat. No. 4,648,499 granted Mar. 10, 1987, it has been proposed to use between the clutch release bearing and the clutch release device to be operated a part referred to as the coupling part which, appropriately attached to the clutch release device, comprises on the side of the latter opposite the clutch release bearing a radial bearing flange through which it is adapted to operate on it, in cooperation with fastening means operative in traction between a coupling part of this kind and a part referred to as the drive part forming part of the clutch release bearing, adapted to provide an axial coupling between said parts in the axial direction from the clutch release device to the clutch release bearing.

In the aforementioned U.S. patent application the fastening means operative in traction generally comprise a coupling member that is elastically deformable in the radial direction, carried by one of the parts to be fastened together in traction, and designed to cooperate abutment fashion with a generally transverse drive bearing surface provided for this purpose on the other part.

A particular advantage of an arrangement such as this is that it enables the clutch release device of the clutch to be operated to be fitted with the coupling part in advance, even before the corresponding clutch cover assembly is put together, and then, at the final assembly stage, the attachment of the clutch release bearing to the coupling part by means of a simple clipping action.

In some of the embodiments described in the aforementioned U.S. patent application the coupling member is an annular ring referred to as the coupling ring which is at least partially engaged radially in an annular retaining groove formed for it on one of the parts to be fastened together in traction, the other of these parts comprising the drive bearing surface with which it has to cooperate to procure such fastening together in traction.

By virtue of this arrangement of the coupling member, all that is necessary is to insert the clutch release bearing axially into the central opening in the clutch release device of the clutch cover assembly: during such insertion, the coupling ring retracts elastically and, subsequently resuming its initial configuration between the bearing surfaces with which it is to cooperate, it ensures the necessary axial coupling between the clutch release bearing and the coupling part.

From this point of view, an arrangement of this kind is satisfactory.

Nevertheless, there may arise the problem of possible uncoupling of the clutch release bearing with respect to the clutch cover assembly, in order to change it, for example.

In one solution proposed in the aforementioned U.S. patent application, a part referred to as the decoupling part is mounted so as to be slidable axially on the drive part of the release bearing, from which it is separate, and like the drive part it also forms part of the clutch release bearing.

In practice, to permit uncoupling of the release bearing, the decoupling part comprises an inclined flank forming one of the flanks of the groove in which the coupling ring is at least partially engaged, the other of the flanks being carried by the drive part, and a radial flange projecting from the edge of the decoupling part.

The flange features an axial flank on the side opposite the clutch release device and forms, at a distance from the clutch release bearing, to be more precise from the ball bearing of the latter, a shoulder adapted for manual actuation of any form of maneuvering member on the decoupling part.

Using any form of maneuvering member, such as a screwdriver, for example, on the decoupling part and more specifically on the shoulder of the flange of the decoupling part, the decoupling part is pushed back in the axial direction towards the coupling ring, the maneuvering member bearing against the cover of the release bearing, for example, to be more precise on an upstanding edge of the cover.

The inclined flank of the decoupling part, forming one flank of the groove in which the coupling ring is disposed, pushes this ring radially out of the groove as it slides axially and thus enables the clutch release bearing to be disengaged by simply withdrawing it.

This device, although entirely satisfactory, makes use of a bearing flange that does not have any bush passing through the clutch release device. If it is required to use a bearing flange with a bush passing through the clutch release device, a solution entailing a decoupling part carrying a Belleville washer bearing on the clutch release device is not suitable, in particular for achieving proper decoupling, as it causes an increase in the overall axial size.

An object of the present invention is to alleviate these disadvantages and to create an arrangement with provision for decoupling using a coupling part with a bearing flange and an axial bush passing through the clutch release device and a decoupling part without any Belleville washer disposed between the decoupling part and the edge of the bush, whilst also providing other advantages.

SUMMARY OF THE INVENTION

The present invention consists in a clutch release bearing assembly comprising a coupling part adapted to couple a clutch release bearing to a clutch release device of a clutch, a substantially axial bush attached to the clutch release device, an engagement bearing surface at the end of the bush, a drive part which is part of the clutch release bearing and comprises an annular groove, a decoupling part slidably mounted on the drive part, fastening means operative in traction between the coupling part and the drive part adapted to couple the parts in the axial direction from the clutch release device to the clutch release bearing and comprising an annular fastening ring which is disposed around the axis of the assembly, elastically deformable in the radial direction and at least partly interlocked on the clutch release bearing side with a bearing surface on the coupling part and on the opposite side with a bearing surface on the drive part formed by one of the flanks of the groove on the drive part, the other flank of which is movable axially relative to the first-mentioned flank and forms part of the decoupling part, and a transverse abutment member for the decoupling part on the clutch release bearing, in which assembly the decoupling part comprises positioning means which are elastically deformable inwardly, have an outside diameter when unstressed which is greater than the inside diameter of the engagement bearing surface on the bush and are adapted to bear on the engagement bearing surface during assembly so as to urge the decoupling part towards the transverse abutment member.

In accordance with another characteristic of the invention, the positioning means comprise at least one substantially axial lug which is in one piece with the decoupling part and which is elastically deformable inwardly.

In accordance with another characteristic, the lug is set back in the axial direction relative to the end of the decoupling part bearing the mobile flank of the groove.

By virtue of this arrangement the mobile flank carried by the decoupling part is positioned at assembly time in a predetermined and constant manner relative to the other, so-called fixed flank of the groove on the drive part.

In accordance with another characteristic the decoupling part has a radial flange projecting from its outside perimeter at the end opposite that bearing the movable flank, the outside diameter of this flange being greater than that of the axial wall surrounding the ball bearing that the clutch release bearing comprises.

It is then sufficient to use the space available at the free circular edge of the release bearing to be able to maneuver the decoupling part by applying a maneuvering member to the side of the flange directed towards the release bearing, which is favorable to a reduced overall axial size of the assembly.

In accordance with another characteristic, the coupling part comprises an axial groove and the flange comprises a radial groove aligned with the axial groove and a sector of reduced thickness disposed symmetrically diametrally opposite the radial groove.

In accordance with another characteristic a bearing plate is held against the side of the flange facing the clutch release bearing.

This plate makes it possible, after fitting the decoupling part to the drive part, to avoid opening up of the part especially on application of a maneuvering member, and serves also as a wear plate.

In accordance with another characteristic of the invention the movable flank of the groove on the drive part is oblique to the axis of the assembly from which it diverges in the direction towards the clutch release device and has an outside diameter less than the median diameter of the ring disposed on the bottom of the groove.

By virtue of this arrangement the movable flank of the groove slides on the drive part until it contacts the fixed flank of the groove and so permits complete expulsion of the fastening ring by narrowing the groove.

In accordance with another characteristic the coupling part comprises a retaining groove having an annular bottom, a bearing surface on one side of the bottom inclined to the axis of the assembly from which it diverges in the direction away from the clutch release bearing and a retaining bearing surface on the other side of the bottom inclined to the axis of the assembly from which it diverges in the direction towards the clutch release bearing.

In accordance with another characteristic the drive part comprises a centering bearing surface, the assembly further comprises an abutment tab which has an inside diameter less than the outside diameter of the centering bearing surface, and the retaining bearing surface merges with this tab.

In accordance with another characteristic the tab comprises an abutment bearing surface which merges with the retaining bearing surface and is of complementary shape to the centering bearing surface.

This tab thus serves as a fixed abutment member preventing unwanted movement of the drive part relative to the coupling part in the axial direction from the clutch release bearing to the clutch release device and serves also as an end of travel indicator at assembly time.

The characteristics and advantages of the invention will emerge from the following description given by way of example only and with reference to the appended drawings.

BRIEF DESCRIPTION OF THE DRAWINGS

FIG. 1 is a view in axial cross-section of a clutch release bearing assembly during offering up of the release bearing.

FIG. 2 is a lateral view in the direction of the arrow F in FIG. 1 showing the flange of the decoupling part.

DESCRIPTION OF THE PREFERRED EMBODIMENT

Figure 3:
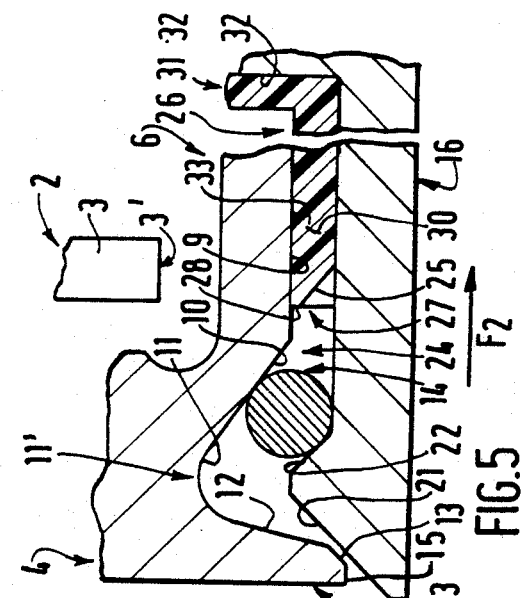
FIGS. 3 through 6 are views to a larger scale illustrating the mounting and decoupling of the clutch release bearing relative to the clutch release device.

As shown in these figures and as more clearly seen in FIG. 1, the overall object is to attach a clutch release bearing 1 to a clutch release device 2 of a clutch, in at least one axial direction, being that corresponding to traction on the clutch release device by the clutch release bearing.

In this instance the clutch release device 2 is formed by the ends of radial fingers 3 of a diaphragm spring which, as is known, comprises a peripheral part forming a Belleville washer for clamping at least one friction disk between two plates and a central part divided into radial fingers.

In the manner which is known per se, for the purpose of coupling the release bearing 1 to the clutch release device 2 there is attached to the latter, by means of the central opening 3' that the clutch release device features, a part 4 referred to as the coupling part.

The coupling part 4 features a radially oriented flange 5 with a bearing surface 5' for the clutch release device 2 to act on and, in one piece with this flange, a bush 6 which extends generally axially through the clutch release device 2 by means of the opening 3' in the latter and at the end of which on the same side as the release bearing 1 there is disposed at its outside periphery a Belleville washer 7 which continuously urges the bearing surface 5' of the coupling member towards the clutch release device 2. In the manner known per se, the fingers 3 of the diaphragm are gripped between the bearing surface 5' and the washer 7 which bears at its inside periphery on a circlip 7' inserted in a groove formed at the end of the bush 6.

At the end facing the clutch release bearing 1 the bush 6 features at the end of its internal bore a frustoconical engagement bearing surface 8 with its concave side facing towards the release bearing.

A cylindrical guide bearing surface 9 of diameter D1 following on from this frustoconical bearing surface 8 merges with a bearing surface 10 inclined to the axis of the assembly, diverging from the axis in the direction away from the clutch release bearing 1. This bearing surface constitutes one of the flanks of an annular retaining groove 11' the bottom 11 of which is of curved shape with a maximum diameter D3 (FIG. 3). This groove 11' is situated in the area where the bush 6 merges with the flange 5.

In this instance the bottom 11 has a substantially semicircular profile in transverse cross-section conforming to that of a fastening ring 14 operative in traction to be described later.

The bottom 11 merges with a retaining bearing surface 12 inclined to the axis of the assembly and diverging from the axis in the direction towards the clutch release bearing 1, in other words in the reverse sense to the bearing surface 10, the latter being concave in the axial direction from the clutch release device to the release bearing 1 whereas the bearing surface 12 is convex in the same direction. This bearing surface 12 thus forms the other flank of the retaining groove 11'.

At the end of the retaining groove 11, to be more precise at the end of the retaining bearing surface 12, there is an abutment bearing surface 13 inclined to the axis of the assembly and diverging from the axis in the direction towards the clutch release bearing 1. Together with an internal bore 15 in the coupling member 4 and the side of the coupling member 4 facing away from the clutch release device 2, the bearing surface 13 delimits an abutment tab 23 of inside diameter D5. Fastening means operative in traction are disposed between the coupling part 4 and the drive part 16 to be described hereinafter and comprise a ring 14 that is elastically deformable radially outwards, carried with clearance by the retaining groove 11'; when unstressed, it is at a distance from the bottom 11 of the retaining groove 11' and at least partially in contact with the bearing surface 12.

The clutch release bearing 2 comprises a drive member 16 through which it acts on the coupling member 4, specifically through the intermediary of the ring 14. In this instance the drive member 16 is formed by an extension 17 of the inside race of a ball bearing 18 coupled axially to a maneuvering member represented schematically at 19 on which operate maneuvering means consisting of the ends of fingers 45 of a clutch operating yoke. This maneuvering member 19 has a sleeve 20 adapted to slide on a flared guide tube surrounding the input shaft of the gearbox. A cover 41 which comprises an axial annular lateral wall 42 is attached to the maneuvering member 19, which is of synthetic material. In the manner which is known per se the release bearing is of the maintained self-centering type, so that there is a clearance between the inside race of the bearing 18 and the sleeve 20; as described in the aforementioned U.S. patent application, the cover 41 is attached to the maneuvering member 19 by clip means with elastically deformable lugs forming part of the maneuvering member 19 and an opening forming part of the cover 41, the openings forming a shoulder for the lugs. The wall 42 bears at diametrally opposed positions relative to each other a pair of oppositely directed transverse bearing surfaces 43, 44 which are disposed substantially transversely to cooperate with the ends of the fingers 45 of the clutch release yoke. The surfaces 43 each form part of one lug 46 which is in one piece with the cover 41, extending transversely and substantially coplanar with the radial flange 19' that the maneuvering member 19 has at its end farthest from the end of the drive part 16. The surfaces 44 each form part of one lug 47 fastened to the cover 41 and extending transversely at a distance from the lug 46, to make provision for accomodating the fingers 45 of the clutch release yoke.

At the free end of the drive member 16 is a frustoconical centering bearing surface 21 of complementary shape to the inclined abutment bearing surface 13 and extended by a drive bearing surface 22 facing towards the clutch release bearing 1 and inclined in the opposite sense to the centering bearing surface. The intersection of the two bearing surfaces forms a cylindrical area 40 of circular cross-section the diameter D2 of which is at most equal to the diameter D1 of the guide bearing surface 9 but greater than the diameter D5 of the internal bore 15 in the abutment tab 23.

This drive bearing surface 22 forms one of the flanks of an annular groove 24 provided for this purpose on the clutch release bearing 1, to be more precise on the outside edge of the drive member 16, the other flank 25 of this groove 24 being movable axially relative to the flank 22 of the groove.

This flank 25 forms part of a part 26 called the decoupling part which is separate from the drive part 16, mounted to slide axially on it and, like the drive part 16, also forms part of the clutch release bearing.

This flank 25 forms part of the edge 27 facing towards the clutch release device 2 of the decoupling part 26 and constitutes the part of the edge 27 nearest the axis of the assembly and oblique to the axis, diverging from the axis in the direction towards the clutch release device. The outside edge or outside diameter of this oblique flank 25 has a diameter less than the median diameter of the ring 14 mounted on the drive part 16 (FIG. 4), to be more precise on the bottom of the groove 24. In accordance with the invention the decoupling part 26 carries at the end facing towards the clutch release device 2, in the vicinity of the edge 27, positioning means 29 that are elastically deformable radially inwards; in the unstressed state their outside diameter is greater than the inside diameter D1 of the engagement bearing surface 8; they are adapted to bear on the bearing surface 8 during assembly so as to urge the decoupling part in the direction towards a transverse abutment member 32 provided for it on the clutch release bearing 1. The abutment member 32 is formed by the shoulder of the inside race of the bearing 18, and the inside diameter of the engagement bearing surface 8 corresponds to the diameter D1 of the guide bearing surface.

The positioning means comprise three substantially axial lugs 30 in one piece with the decoupling part 26 and elastically deformable radially inwards; the lugs feature at their ends facing towards the clutch release device a rounded contact bearing surface 33 and they are set back in the axial direction relative to the edge 27 of the decoupling part. In the unstressed condition, that is to say in the deployed position, the lugs 30 project radially.

The decoupling part 26 is of a synthetic material.

Also, as can be seen in FIGS. 1 and 2, the decoupling part 26 has an L-shaped cross-section and comprises a radial flange 31 for a maneuvering member to act on, projecting from its edge, disposed at the end of the decoupling part 26 opposite the edge 27, with an outside diameter greater than that of the axial wall 42 of the cover 41.

For the purpose of mounting it on the drive part 16, the radial flange 31 has a radial groove 34 extending radially outwards as an extension of an axial groove 35. The axial groove 35 extends to either side of the axial part of the decoupling part 26, merging with the radial groove 34. Also, the flange 31 features a sector 36 of reduced thickness diametrally opposite the groove 34 and which, because of its limited circumferential extent and because of its reduced thickness, procures further elasticity on opening up of the grooves 34 and 35 of the decoupling part 26 for mounting it on the drive part 16, over the edge 21 of the drive part 16, for example.

After it is mounted on the drive part 16 a plate 37 called a wear plate is placed against the side of the flange 31 facing towards the clutch release bearing 1 and is held against this side of the flange by crimping the edges 38, 39 of the plate to the flange. To be more precise, the outer edge of the plate is bent axially towards the clutch release device to form the axial edge 39 and then radially towards the axis of the assembly to form the radial edge 38, trapping the outside peripheral edge of the flange 31. Thus, because of this plate 37, the flange 31 and the axial part of the decoupling part 26 can no longer open out radially.

Final assembly is carried out as follows, as is seen best in FIGS. 3 through 6:

In the first phase (FIG. 1), the clutch release bearing 1 with its decoupling part 26 and its flange 31, as described hereinabove, is offered up to the coupling part 4 carrying the coupling ring 14.

Through the action of the fingers 45 of the yoke on the bearing surfaces 44 of the lugs 47, the release bearing is offered up opposite the central opening in the coupling part 4 with the centering bearing surface 21 of the drive part 16 facing the engagement bearing surface 8 of the coupling part 4.

As the movement continues, and assuming initial misalignment, the release bearing 1 is pre-centered relative to the coupling part 4 by the two bearing surfaces 8 and 21 and then the drive member 16 slides and is centered by its area 40 along the cylindrical guide bearing surface 9 of the coupling part 4, entraining with it the decoupling part 26 and in particular the end of the decoupling part facing towards the clutch release bearing 1, which is inserted under the bearing surface 9 until the positioning means consisting of the lugs 30 in the deployed position come into contact through their rounded edges 33 with the frustoconical bearing surface 8 on the coupling part 4.

As the movement continues after such contact occurs, the decoupling part is urged towards the clutch release bearing 1 by the lugs 30 in contact with the bearing surface 8 and slides over the outside periphery of the drive member 16 until its rear part comes into contact with the transverse abutment member 32 provided for it on the clutch release bearing 1.

After this movement, and as can be seen in FIG. 3, the decoupling part 26 is butted up against the clutch release bearing at 32 and is in contact with the bearing surface 8. The mobile flank 25 is therefore positioned in a predetermined manner relative to the other, so-called fixed flank of the groove 24, consisting of the drive bearing surface 22, and to the frustoconical engagement bearing surface 8 of the coupling part 4. Also, the frustoconical centering bearing surface 21 of the drive part 16 pre-centers the fastening means consisting of the ring 14.

Figure 4:
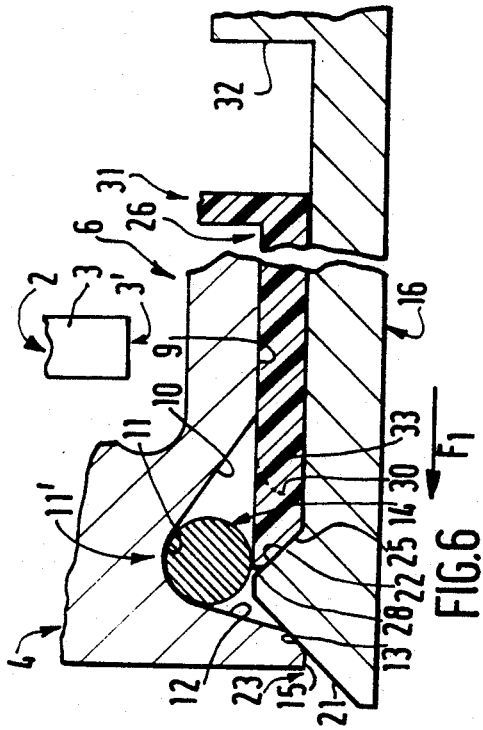

As the movement continues in the direction of the arrow F1 in FIG. 4, the coupling part 4 being regarded for convenience as being fixed in position, the clutch release bearing 1, the decoupling part 26 and the flange 31 of the latter move in the axial direction from the release bearing to the coupling part 4. This displacement causes the lugs 30 which are elastically deformable inwardly to be inserted into the opening in the coupling part 4, the lugs retracting by virtue of their elasticity and because of their contact with the frustoconical bearing surface 8; at the same time, by virtue of its radial elasticity, the ring 14 is deployed and slides along the bearing surface 21 and simultaneously along the bearing surface 12 until its outside diameter is approximately situated in the bottom 11 of the retaining groove 11' while its inside diameter is situated at least on the diameter D2 of the area 40. When the ring 14 is in contact with the area 40 there is a slight clearance between the ring and the bottom 11 of the groove 11'.

As the movement continues the vertical axis of the ring 14 leaves the area 40 and, resuming its initial position because of its radial elasticity, the ring slides along the bearing surface 22 of the groove 24 and along the bearing surface 10 of the coupling part 4 until it comes into contact through its inside diameter with the bottom of the groove 24.

The movement continues until the bearing surface 21 on the drive part 16 comes into contact with the abutment bearing surface 13 on the tab 23. Resisting further movement, this contact indicates to the operator that the ring 14 is in the groove 24 in the drive part 16. At this stage (FIG. 4) the ring is disposed with clearance between the bearing surfaces 22 and 10.

Figure 5:
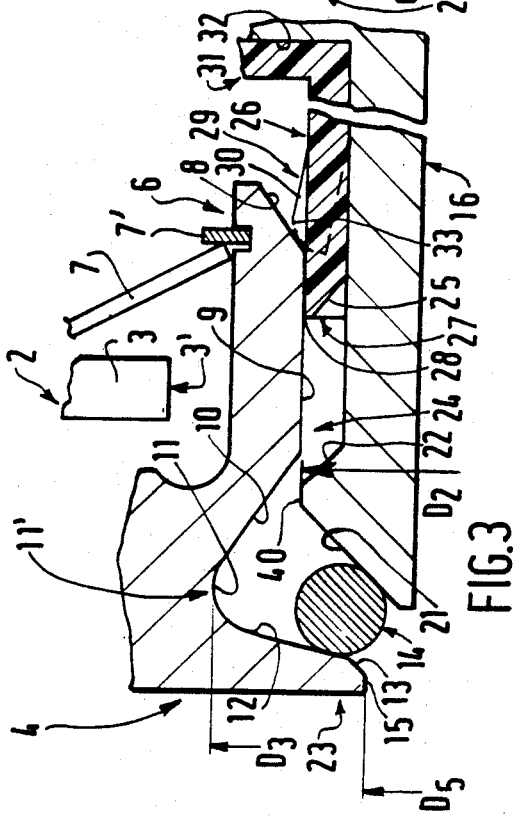

After this operation all that is necessary, after registering the fact that the ring 14 is in the groove 24, is to execute a movement in the opposite direction, through bearing engagement of the fingers 45 of the yoke on the bearing surfaces 43 of the lugs 46, to bring the ring 14 into contact with the drive bearing surface 22 of the drive part 16 and with the bearing surface 10 of the coupling part 4 (FIG. 5). This configuration then provides an axial coupling between the coupling part 4 and the drive part 16 in the direction from the clutch release device 2 to the release bearing 1 so as to transmit the axial clutch release action. It will be noted that during the operations described above the flank 25 is at a distance from the ring 14, the length of the decoupling part 26 and that of the drive part 16 being determined in consequence of this. Thus during assembly, after the engagement means 29 come into contact with the engagement bearing surface 8, the width of the groove 24 is greater than the thickness of the ring 14.

Figure 6:
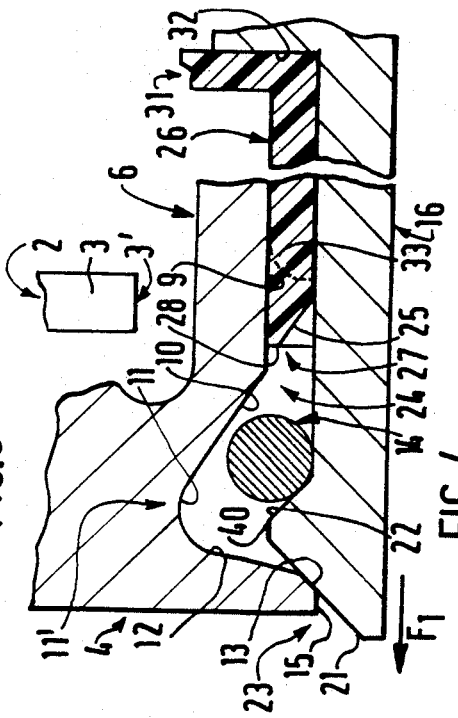

In order to demount the assembly, starting from the FIG. 5 situation, for example, it is sufficient to cause the fingers 45 of the yoke to act on the surfaces 44 of the lugs 47 so as to move the clutch release bearing in the direction of the arrow F1 in FIG. 6 so that the drive part 16 and more particularly its bearing surface 21 comes into contact with the bearing surface 13 of the tab 23 on the coupling part 4 and so that, once this has been achieved, a maneuvering member, for example a manual maneuvering member such as a screwdriver, can be applied in the same axial direction against the side of the radial flange 31 facing towards the bearing 18 so that, the drive part 16 being butted up against the bearing surface 13 on the coupling part 4, the decoupling part 26 slides over the outside periphery of the drive part 16, closing the groove 24.

This sliding motion is thus effected in the axial direction from the clutch release bearing 1 to the clutch release device 2, overcoming the friction effect of the lugs 30 in contact with the bearing surface 9 of the coupling part 4, until the mobile flank 25 at the end of the decoupling part 26 comes into contact with the coupling ring 14.

From this position, as the movement continues, the radial part 28 of the edge 27, the outside diameter of which is in this case below the median axis of the ring in contact with the bottom of the groove 24, pushes the ring 14 towards the frustoconical bearing surface 22 and causes it to slide along this bearing surface; during this sliding movement it is deployed by virtue of its elasticity and its ability to open out radially. The ring 14 slides along the bearing surface 22 until it leaves the bearing surface whereupon its outside diameter lies approximately on the bottom of the groove 11 and its inside diameter on the outside diameter of the decoupling part 26 (FIG. 6). This is made possible by the inclined flank 25 which, because its shape is complementary to that of the bearing surface 22, enables the radial part 28 to move in the axial direction from the clutch release bearing 1 to the clutch release device beyond the vertical axis of the ring 14, situated in its groove 11, and to come into contact with the bearing surface 22 through its inside edge.

As can be seen in FIG. 6, this position eliminates the groove 24 and prevents the ring 14 returning to the bearing surface 22 and therefore into the groove 24 in the drive part 16 as a result of any misoperation.

Starting from the position of FIG. 6, all that is necessary is to move the release bearing in the reverse direction by causing the fingers 45 of the yoke to bear on the surfaces 43 of the lugs 46, which moves the release bearing 1 in the direction from the clutch release device to the release bearing and so enables release of the release bearing 1 from the coupling part 4 by virtue of sliding of the ring 14 over the bearing surfaces 21 and 12.

The distance (D3−D2)/2 must be at least equal to the thickness of the ring 14.

Likewise, the angle between the axis of the assembly and the drive bearing surface 22 of the drive part 16 and the angle between this same axis and the drive bearing surface 10 of the coupling part 4 are suitably sized to permit transmission of the overall traction force.

It is to be understood that the invention is not limited to the embodiments described but encompasses all variant executions of its various component parts and variant applications within the scope of the claims; in particular, the end 33 of the lugs 30 may be bevelled and the coupling part, rather than being clamped to the clutch release device, may be attached to it by means of retaining fingers each carrying a lug of the flange as described in the aforementioned U.S. patent application.

In particular, instead of the decoupling member having a slot for mounting on the drive part, it may have notches uniformly spaced around each of its axial edges, the notches on one axial edge circularly alternating, and axially overlapping the notches on the other axial edge.

There is claimed:

1. A clutch release bearing assembly comprising a coupling part adapted to couple a clutch release bearing to a clutch release device of a clutch, a substantially axial bush attachable to the clutch release device, an engagement bearing surface at an end of said bush, the clutch release bearing including a drive part having an annular groove defined by two flanks, a decoupling part slidably mounted on said drive part, fastening means operative in traction between said coupling part and said drive part for coupling said parts in an axial direction away from the clutch release device toward said clutch release bearing and comprising an annular fastening ring, said fastening ring being disposed around the axis of the assembly and being elastically deformable in a radial direction, said fastening ring being partly engageable with a bearing surface on said coupling part and with a bearing surface on said drive part, said bearing surface on said drive part being formed by one of said two flanks of said groove on said drive part, the other of said two flanks of said groove being movable axially relative to said one flank and forming part of said decoupling part, and a transverse abutment member for said decoupling part on said clutch release bearing, said decoupling part having positioning means, said positioning means being radially inwardly elastically deformable and having an outside diameter when unstressed which is greater than the inside diameter of said engagement bearing surface on said bush, and said positioning means being adapted to bear on said engagement bearing surface during assembly so as to urge said decoupling part towards said transverse abutment member.

2. A clutch release bearing assembly according to claim 1, wherein said positioning means comprise at least one substantially axial lug which is in one piece with said decoupling part and which is radially inwardly elastically deformable.

3. A clutch release bearing assembly according to claim 2, wherein said lug is set back in the axial direction relative to the end of said decoupling part forming said mobile flank of said groove.

4. A clutch release bearing assembly according to claim 1, wherein said clutch release bearing includes a ball bearing, an axial wall surrounding said ball bearing, and wherein said decoupling part is substantially L-shaped in section and has a radially outwardly projecting flange at an end remote from said movable flank, the outside diameter of said flange being greater than that of said axial wall.

5. A clutch release bearing assembly according to claim 4, wherein said decoupling part comprises an axial groove and said flange comprises a radial groove aligned with said axial groove and a sector of reduced thickness disposed symmetrically diametrally opposite said radial groove, thereby enhancing elasticity of said decoupling part upon assembly.

6. A clutch release bearing assembly according to claim 4, further comprising a bearing plate held against the side of said flange facing said clutch release bearing.

7. A clutch release bearing assembly according to claim 1, wherein said movable flank of said groove on said drive part is oblique to the axis of the assembly and is inclined radially outwardly towards said clutch release device and has an outside diameter less than the median diameter of said ring.

8. A clutch release bearing assembly according to claim 7, wherein said coupling part comprises a retaining groove having an annular bottom and a bearing surface on one side of said bottom inclined radially inwardly towards said clutch release bearing.

9. A clutch release bearing assembly according to claim 8, wherein the groove of said coupling part has a retaining bearing surface merging into an abutment tab, said drive part having a centering bearing surface, said abutment tab having an inside diameter less than the outside diameter of said centering bearing surface.

10. A clutch release bearing assembly according to claim 9, wherein said tab comprises an abutment bearing surface which merges with said retaining bearing surface and is of complementary shape to said centering bearing surface.

* * * * *